P. J. STRIMPLE.
DIRIGIBLE AND TILTABLE HEADLIGHT.
APPLICATION FILED MAR. 22, 1918.
1,311,254.
Patented July 29, 1919.
2 SHEETS—SHEET 1.
Fig. 1
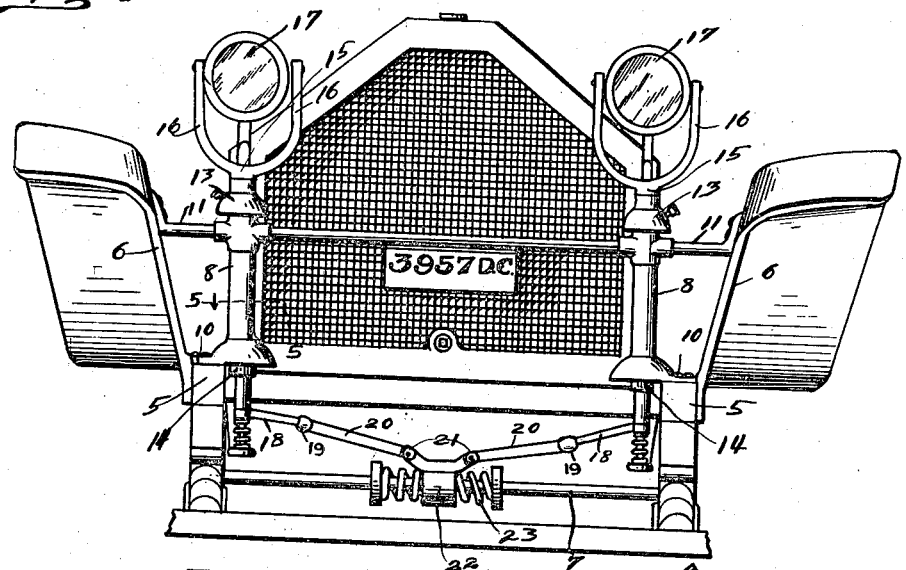
Fig. 3
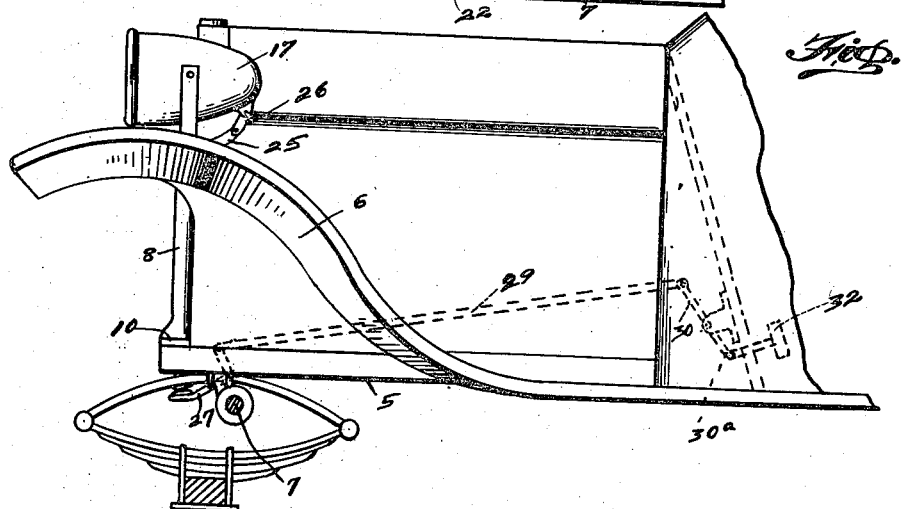
Fig. 5
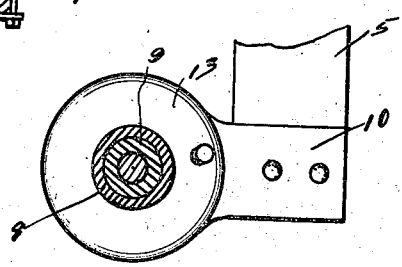
Witnesses
Inventor
P. J. Strimple
By 
Attorney.

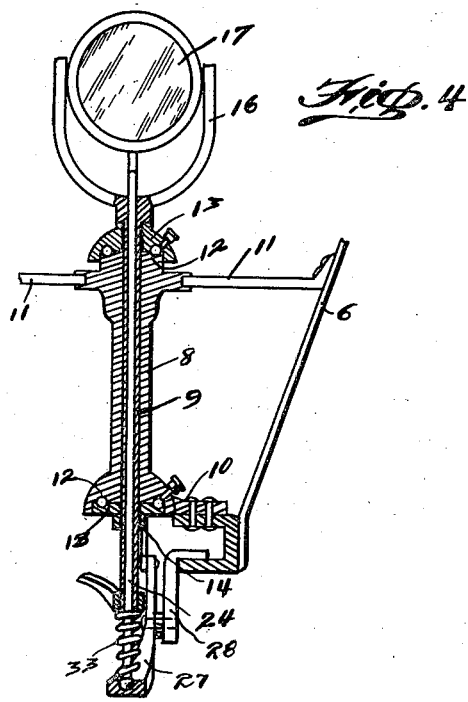
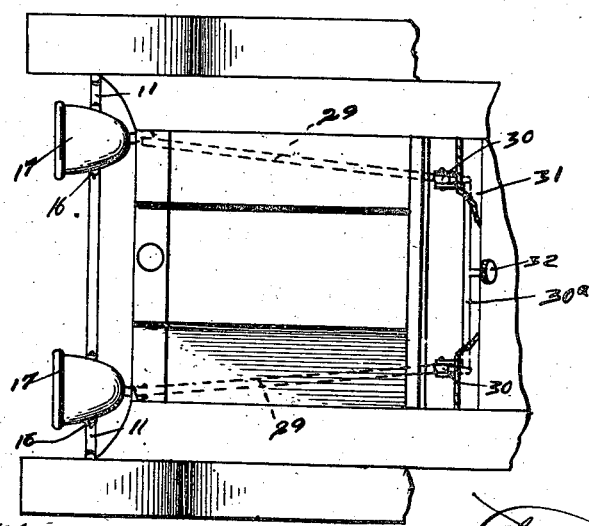

UNITED STATES PATENT OFFICE.

PIERCE J. STRIMPLE, OF CLEVES, OHIO.

DIRIGIBLE AND TILTABLE HEADLIGHT.

1,311,254. Specification of Letters Patent. Patented July 29, 1919.

Application filed March 22, 1918. Serial No. 223,930.

*To all whom it may concern:*

Be it known that I, PIERCE J. STRIMPLE, a citizen of the United States, residing at Cleves, in the county of Hamilton, State of Ohio, have invented certain new and useful Improvements in Dirigible and Tiltable Headlights; and I do hereby declare the following to be a full, clear, and exact description of the invention, such as will enable others skilled in the art to which it appertains to make and use the same.

The present invention relates to new and useful improvements in headlight mountings for automobiles or other vehicles, and more particularly of that type wherein provision is made for turning the headlights to properly precede the path of the automobile when turning and for tilting the headlights so that rays of light therefrom will not blind a person approaching the automobile from the front, these movements being accomplished independently, and being each procurable independently of the headlight position effected by the other.

It is in general the object of this invention to simplify and otherwise improve the structure and to increase the efficiency and durability of devices of this character.

A more specific object resides in the provision of means for controlling the tilting movement of the headlights which may include a single control member engageable with each headlight, to hold it positively against possible undesired tilting vibrations due to jarring of the automobile.

A further object resides in the provision of an exceedingly simple electrical control for tilting movement of the headlights.

With the above and other objects and advantages in view, the invention resides more particularly in the novel combination, formation and arrangement of parts hereinafter described and particularly pointed out in the appended claims.

In the accompanying drawings:

Figure 1 is a front elevation of portions of an automobile having the improved headlight mounting associated therewith.

Fig. 2 is a plan view of what is shown in Fig. 1.

Fig. 3 is a side elevation thereof.

Fig. 4 is a vertical sectional view through one of the lamp posts.

Fig. 5 is a transverse sectional view on the line 5—5 of Fig. 1.

Referring now more particularly to the drawings, 5 designates each of the side sills of an automobile chassis, 6 designates portions of the mud guards and 7 designates the usual connecting rod for the steering knuckle arms.

Each of the headlight mountings comprises a vertical casing 8 in which is rotatably mounted a tubular lamp post 9, and which is secured at its lower end by a lateral foot 10 bolted to the adjacent sill 5. The upper ends of the casings are secured by connecting rods 11 therebetween and between the casings and the mud guard brackets, the center rod serving as the attaching means for the license member plate in such instances as a front plate is necessary. Each end portion of each casing 8 is enlarged to form a ball race 12 coacting with race members 13 fitted on the end portions of the post 9, the lower member 13 being secured by a nut 14 threaded on the post while the upper member 13 is secured by threaded engagement on the post of the connecting head 15 of a pair of upstanding arms 16 between which is pivoted the lamp 17. A simple and strong support is thus provided wherein the lamp may be swung both horizontally and vertically to throw its light in any direction forwardly of the machine within given limits.

To swing the lamp horizontally to accord with steering movements of the automobile, an arm 18 is secured to and extends rearwardly of the lower end of each post 9 and is connected by a ball joint 19 with one end of an arm 20 which has its other end connected by a ball joint 21 with a coupling member 22 on the steering arm rod 7, and common to both lamp mountings, said member comprising a sleeve loose on said rod and held between a pair of coil springs 23, to take up sudden jars which might be caused by turning engagement of the automobile wheels with road obstructions. The lamps are thus automatically turned coincident with movement of the steering gear.

For manually tilting said lamps, to conform with the light regulations of a community, or to prevent the subjection of approaching persons to a blinding glare, a rod 24 is slidably passed through each post 9 and has its upper end rearwardly directed at 25 and pivoted to a link 26 which in turn is pivoted to the rear end of the corresponding lamp 17. The lower end of the rod is extended below the post and terminates in a ball head in sliding engagement with the flattened end of one arm of an angle lever 27 pivoted to a bracket 28 depending from the adjacent sill 5. To the other arm of this lever is pivoted one end of a link 29 having its other end pivoted to one end of a straight lever 30 pivoted on the under face of the dash board 31 and having a foot pedal 32 connected with its other end, through the medium of a cross bar 30ª connecting the other ends of the levers for both mountings. The tilting rod 24 is normally depressed by an expansile spring 33 disposed between its head 26 and the lower end of the post 9, to hold the headlights in horizontally directed position. Thus by depressing the foot pedal 32, the lamps may be tilted downwardly any desired degree.

An effective and exceedingly simple and durable mounting has thus been provided, whereby a pair of headlights may be automatically turned to properly precede the path of the vehicle, and may be manually tilted to depress their rays to obviate the blinding glare of horizontal projection.

The various bearing parts of the device are so arranged as to prevent the ingress of dust or other foreign matter, it being particularly noted that the edge portions of the bearing race members are disposed in overlapping relation for this purpose.

What is claimed is:

1. A device of the class described comprising a casing, a tubular carrying member rotatably mounted in the casing and having means for oscillating it, a lamp pivotally carried by the carrying member, a rod extending through the carrying member and pivotally connected at its upper end with the lamp, a lever upon which the lower end of the rod is disposed, a foot pedal connected with the lever for rocking it and a spring disposed to hold the rod normally with the lamp at a predetermined point of its pivotal movement.

2. A device of the class described comprising a supporting casing, a tubular carrying member mounted in the casing for oscillation, a lamp carried pivotally by the carrying member, a rod slidably mounted in the carrying member and having links pivotally connecting its upper end with the lamp for pivotally moving the latter, the rod extending below the carrying member and terminating in a head, a lever having a bearing in which the head of the rod is received and adapted to shift the rod when rocked to pivotally move the lamp in one direction, a foot pedal connected with the lever for actuating it in one direction and a helical spring encircling the rod and bearing at one end against its head and at the other end against the carrying member whereby to hold the rod yieldably with the lamp against tilting movement.

In testimony whereof, I affix my signature, in the presence of two witnesses.

PIERCE J. STRIMPLE.

Witnesses:
LORETTO M. E. DINIGLE,
SAMUEL STERN.